United States Patent [19]

Aso et al.

[11] Patent Number: 4,788,400

[45] Date of Patent: Nov. 29, 1988

[54] WIRE CUT ELECTRIC DISCHARGE MACHINE EQUIPPED WITH A CONDUCTIVE WORK TABLE

[75] Inventors: Toshiyuki Aso, Hino; Sadahiro Watanabe, Kunitachi, both of Japan

[73] Assignee: Fanuc Ltd., Yamanashi, Japan

[21] Appl. No.: 146,166

[22] PCT Filed: May 27, 1987

[86] PCT No.: PCT/JP87/00338

§ 371 Date: Dec. 24, 1987

§ 102(e) Date: Dec. 24, 1987

[87] PCT Pub. No.: WO87/07193

PCT Pub. Date: Dec. 3, 1987

[30] Foreign Application Priority Data

May 29, 1986 [JP] Japan ................................ 61-122274

[51] Int. Cl.$^4$ ............................................. B23H 7/02
[52] U.S. Cl. ............................. 219/69 W; 204/297 R; 219/69 R
[58] Field of Search ............... 219/69 W, 69 R, 69 G, 219/69 V; 204/297 R, 297 M, 297 W, 206, 224 M

[56] References Cited

FOREIGN PATENT DOCUMENTS

| | | |
|---|---|---|
| 58-137523 | 8/1983 | Japan ........................ 219/69 W |
| 58-206310 | 12/1983 | Japan . |
| 60-45619 | 3/1985 | Japan . |
| 60-263622 | 12/1985 | Japan . |

*Primary Examiner*—A. D. Pellinen
*Assistant Examiner*—Geoffrey S. Evans
*Attorney, Agent, or Firm*—Armstrong, Nikaido, Marmelstein & Kubovcik

[57] ABSTRACT

A wire cut electric discharge machine (10) is equipped with a work table including a horizontal slide table (20) mounted on a metallic bed (14) of the wire cut electric discharge machine (10), and a work rest (22) fixed to the upper surface of the horizontal slide table (20). The horizontal slide table (20) and the work rest (22) are formed of an electro-conductive ceramic material to connect the work table directly electrically to the grounded metallic bed (14) so that the work table is held at ground potential without increasing reactance (L).

2 Claims, 1 Drawing Sheet

WIRE CUT ELECTRIC DISCHARGE MACHINE EQUIPPED WITH A CONDUCTIVE WORK TABLE

TECHNICAL FIELD

The present invention relates generally to a wire cut electric discharge machine and, more particularly, to a wire cut electric discharge machine equipped with a work table comprising a horizontal slide table formed of a conductive ceramic material and a work rest formed of a conductive ceramic material and fixed to the upper surface of the horizontal slide table, and capable of moving in a horizontal plane to move a work fixedly mounted thereon in a horizontal plane relative to a wire electrode running in a vertical direction.

BACKGROUND ART

As generally known, a wire cut electric discharge machine causes an electric discharge between a wire electrode and a workpiece when processing the workpiece for various kinds of machining processes, such as cutting, boring and shaping. Generally, the workpiece is held at ground potential and the wire electrode is held at a discharge potential, during electric discharge machining. Therefore, in most cases, the workpiece is connected electrically through the work table to a metallic bed.

Electric discharge machining entails a generation of heat in the machining section, and accordingly, a wire cut electric discharge machine for precision machining employs a heat nonconductive stone surface plate, such as a granite surface plate, as a horizontal slide table, and a work rest formed of a heat nonconductive material, to avoid deterioration of the machining accuracy due to a thermal deformation of the work table. The workpiece is connected electrically to the bed of the electric discharge machine by a grounding wire to hold the workpiece at ground potential.

Such a conventional electric discharge machine equipped with a work table formed of a heat nonconductive material, such as granite, having a comparatively small coefficient of linear expansion is able to avoid the deterioration of machining accuracy attributable to heat. However, grounding the workpiece by a grounding wire increases the reactance (L), entailing a reduction of machining speed and a deterioration of accuracy in detecting the progress of machining through a change of voltage.

DISCLOSURE OF THE INVENTION

Accordingly, it is an object of the present invention to solve the aforesaid problems in the conventional wire cut electric discharge machine.

It is another object of the present invention to provide a wire cut electric discharge machine equipped with a conductive work table which is effectively applied particularly to a wire cut electric discharge machine, for a very precise machining.

To achieve the objects of the invention, the present invention provides a wire cut electric discharge machine equipped with a work table comprising a horizontal slide table and a work rest fixed to the upper surface of the horizontal slide table, characterized in that the horizontal slide table and the work rest are formed of a conductive ceramic material.

That is, the present invention provides a wire cut electric discharge machine having a conductive work table mounted on the bed of the wire cut electric discharge machine and thus held directly at ground potential. Accordingly, a workpiece fixed to the work rest of the conductive work table is connected electrically through the horizontal slide table formed of a conductive ceramic material to the metallic bed of the wire cut electric discharge machine, so that the workpiece is held at ground potential.

BRIEF DESCRIPTION OF THE DRAWING

The above and other objects and advantages of the present invention will be described hereinafter in conjunction with the accompanying drawing, in which.

BEST MODE FOR CARRYING OUT THE INVENTION

Figure 1:
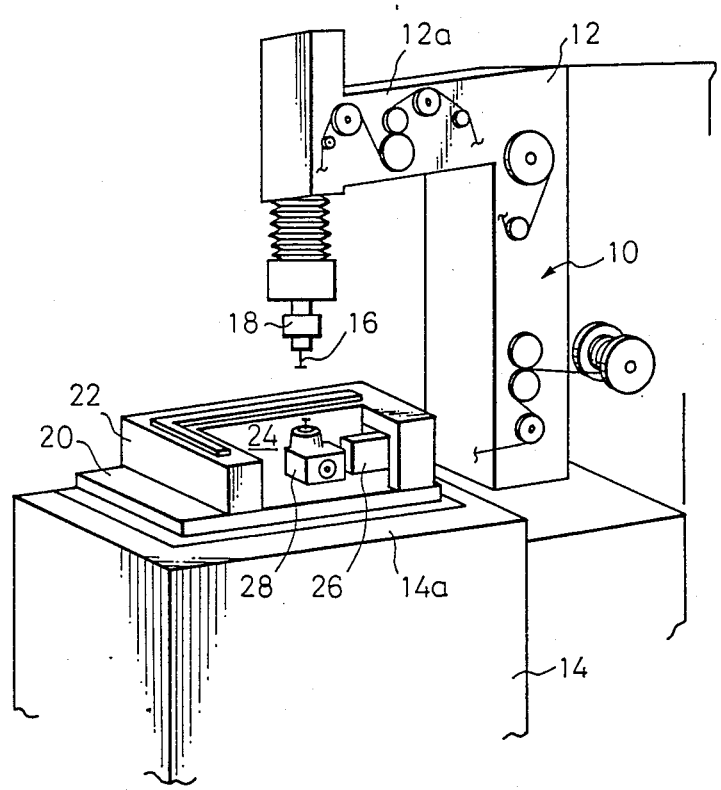
FIG. 1 is a schematic perspective view of a wire cut electric discharge machine equipped with a conductive work table in accordance with the present invention.

Referring to FIG. 1, a wire cut electric discharge machine 10 has a column 12 and a bed 14. A supply drum for supplying a wire electrode 16, a take-up drum for taking up the electrode wire 16, and rollers such as guide rollers and pinch rollers are provided on the column 12. An upper head 18 is attached for vertical movement to the extremity of an arm 12a extending to the front from the column. A slide table 20 capable of moving in a horizontal plane independently or simultaneously in the respective directions of two axes perpendicular to each other is mounted for movement in the horizontal plane on the upper surface 14a of the metallic bed 14, and a work rest 22 is provided fixedly on the slide table 20. The work rest 22 defines an internal space 24, into which a lower arm 26 projects from the column 12. A lower head 28 is provided on the extremity of the lower arm 26 so as to be located directly below the upper head 18. As generally known, dies 18a and 28a for guiding the wire electrode 16 are provided on the upper head 18 and the lower head 28, respectively.

Generally, a workpiece, not shown, to be subjected to electric discharge machining is electrically conductive. The workpiece is placed on and is fixed to the work rest 22 by a suitable clamping means as used when fixing a workpiece on the work rest of the conventional electric discharge machine. The work rest 22 and the slide table 20 of the present invention are formed of an electro-conductive ceramic material, for example, SIALON, and, in general, the slide table 20 is in close mechanical contact with the bed 14 formed of iron or the like. Therefore, the workpiece is electrically grounded through the bed 14, and thus, the potential of the workpiece drops automatically to ground potential. That is, a grounding wire formerly necessary for grounding the workpiece is now unnecessary. Although the slide table 20 and the work rest 22 of this embodiment are separate members, if necessary, the slide table 20 and the work rest 22 may be formed as an integral unit. Since conductive ceramics on the market are electrically conductive, conductive ceramics can be machined through electric discharge machining using a wire cut discharge machine or an ordinary electric discharge machine. Accordingly, the slide table 20 and the work rest 22 can be easily formed as an integral unit through the electric discharge machining of a conductive ceramic material. Of course, a discharge voltage is applied to the wire electrode 16 as in the conventional wire cut electric discharge machine.

The conductive work table of the present invention thus constructed is able to ground the workpiece directly without using a grounding wire, to thus eliminate the disadvantageous reduction of a machining speed due to an increase in reactance. Furthermore, since ceramics, similar to a stone such as granite for a surface plate, have a comparatively small coefficient of linear expansion as compared with metals such as stainless steels, the thermal deformation of the ceramic work rest is limited to a low extent even if the machining liquid wetting the work rest during electric discharge machining derives the latent heat of evaporation from the work rest and causes temperature differences between positions in the work rest, and thus the machining accuracy of the wire cut electric discharge machine is maintained at a high level.

We claim:

1. A wire cut electric discharge machine equipped with a work table comprising a horizontal slide table mounted on a metallic bed thereof, and a work rest fixedly mounted on said horizontal slide table, characterized in that said horizontal slide table and said work rest are formed of an electro-conductive ceramic material to electrically connect said work table directly to said metallic bed so that said work table is held at ground potential.

2. A wire cut electric discharge machine according to claim 1, wherein said horizontal slide table and said work rest are formed of a conductive ceramic material as an integral unit.

* * * * *